Figure 1:
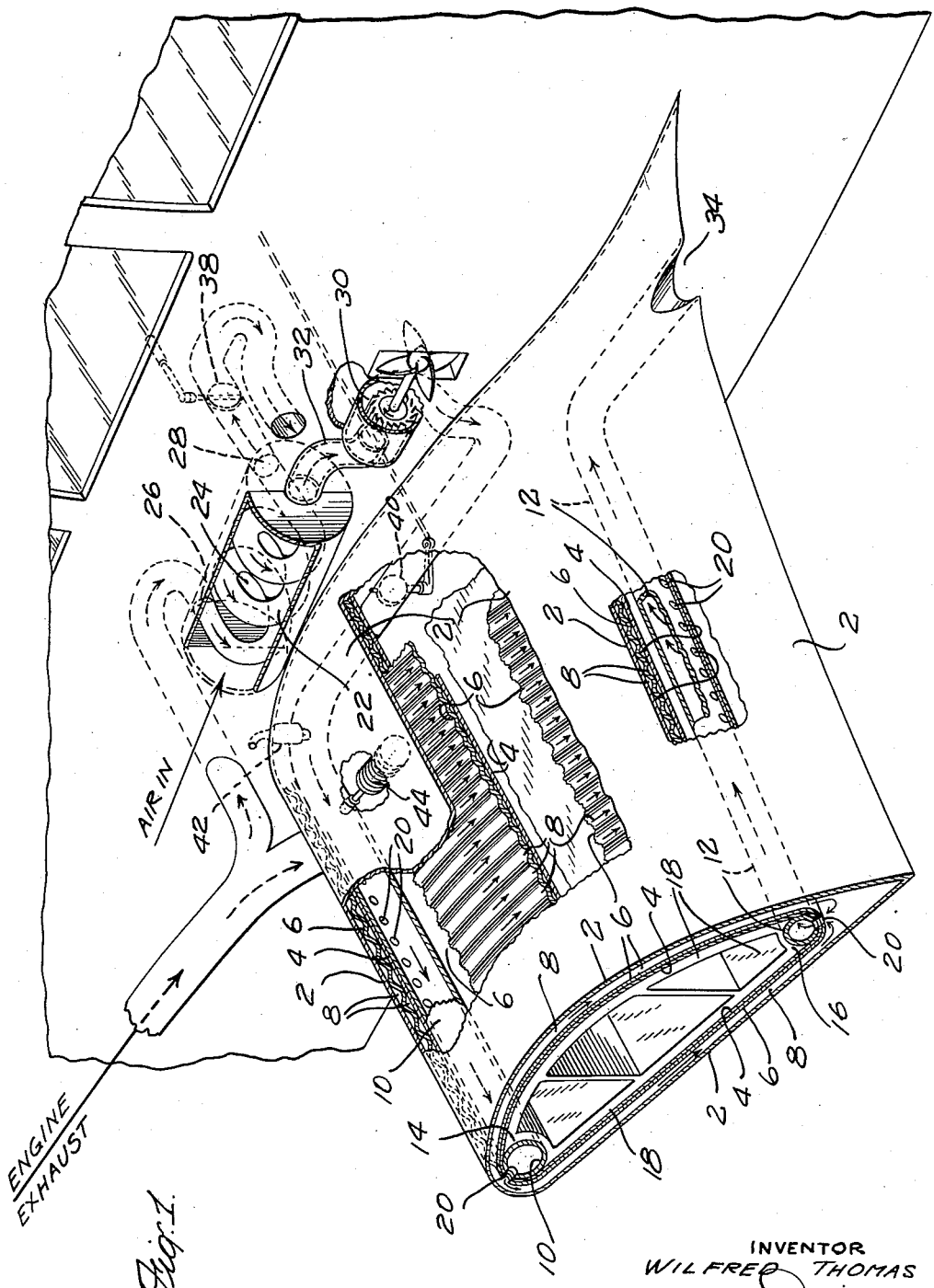

July 4, 1950 W. THOMAS 2,514,105
AIRFOIL CONDITIONING MEANS
Filed Dec. 7, 1945 2 Sheets-Sheet 1

INVENTOR
WILFRED THOMAS
BY
ATTORNEY

INVENTOR
WILFRED THOMAS
ATTORNEY

Patented July 4, 1950

2,514,105

UNITED STATES PATENT OFFICE 2,514,105

AIRFOIL CONDITIONING MEANS

Wilfred Thomas, Albany, N. Y.

Application December 7, 1945, Serial No. 633,448

3 Claims. (Cl. 244—134)

This invention relates to means for so conditioning the airfoils or other exposed parts of airplanes as to prevent changes in the aerodynamic characteristics of the plane structure as a whole by reason of any adverse weather conditions which it may encounter in flight. Although the invention is particularly adapted for application to the wings of an airplane and the term "airfoil" is used in the claims to describe the structure to which the invention is applicable, it will be understood that this term is not used in a limiting sense and that the invention is likewise applicable to the conditioning of the exposed surfaces of other parts of the plane, than the wings, which might be so affected by adverse weather conditions as to tend to change the aerodynamic characteristics of the plane.

Although various schemes have been proposed to prevent the formation of ice at critical points upon airplane surfaces, and particularly upon the leading edges of the wings, and various mechanical means have been proposed and employed for effecting a de-icing of these leading edges, all of these schemes and devices have certain limitations as to their utility. They also usually require a special adaptation of the design of the airfoil to permit their use.

A general object of the present invention is to provide airfoil conditioning means which requires no substantial change in the form or structure of existing airfoils and which at the same time will provide both better conditioning of the exposed surfaces thereof and an increased strength of structure.

A particular object of the invention is to provide an improved airfoil sheathing which may also have utility in other fields and which is provided with ducts for conducting a heating or other conditioning fluid that are so distributed throughout its area as to insure heating or conditioning of all of the exposed surfaces of the sheathing, these ducts not only serving as conduits for the heating or other conditioning fluid but also as means for reinforcing the sheathing without substantial increase of the weight thereof.

An important feature of the invention, in one embodiment thereof, is the provision of a laminated sheathing, an intermediate lamina of which is so corrugated as to form, with the adjacent laminae, the ducts for the heating or other conditioning fluid. Another important feature of the invention is the provision of intake and exhaust conduits having openings communicating with the ducts for the heating or other conditioning fluid which are so proportioned to the contemplated flow of fluid through the system as to insure distribution of the fluid among all of the ducts.

Other objects and important features of the invention to which attention has not hereinabove specifically been directed will appear hereinafter when the following descripton and claims are considered in connection with the accompanying drawings, in which—

Figure 2:
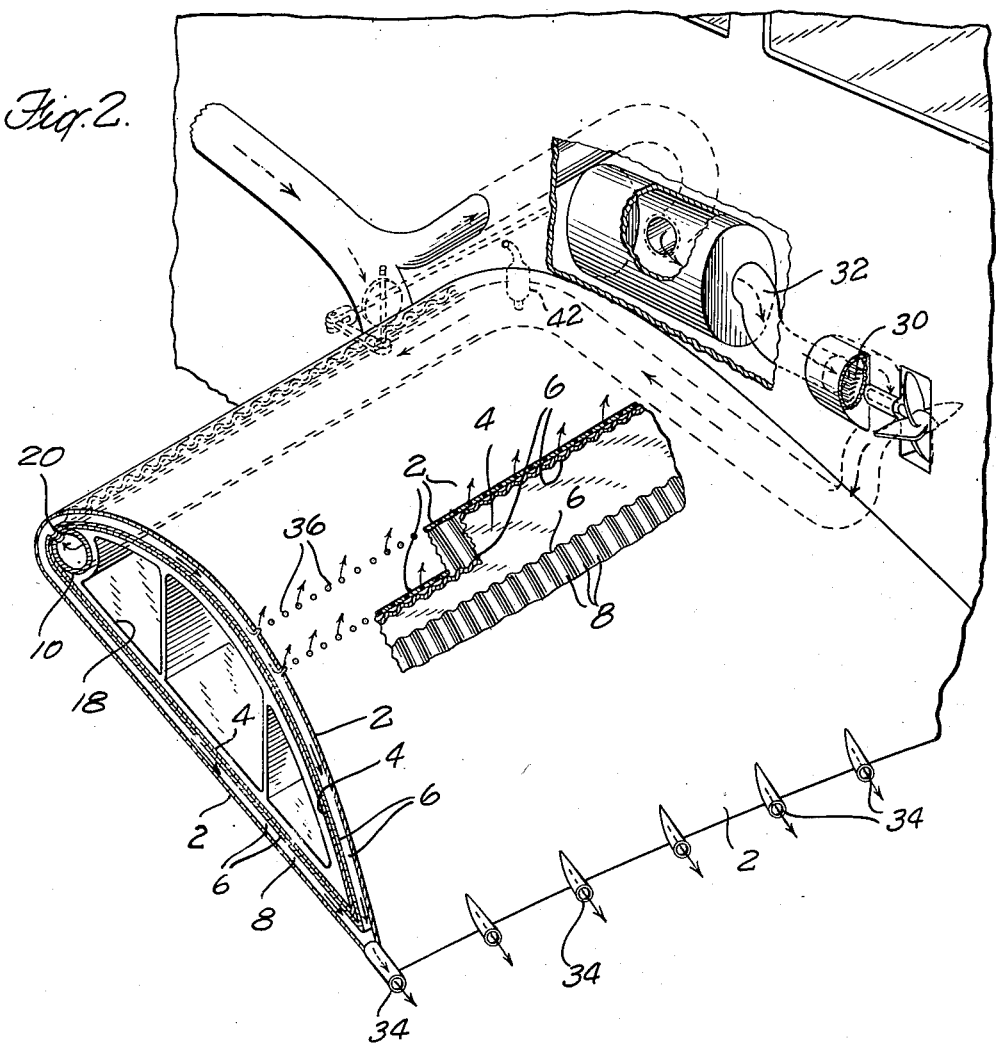
Figure 3:
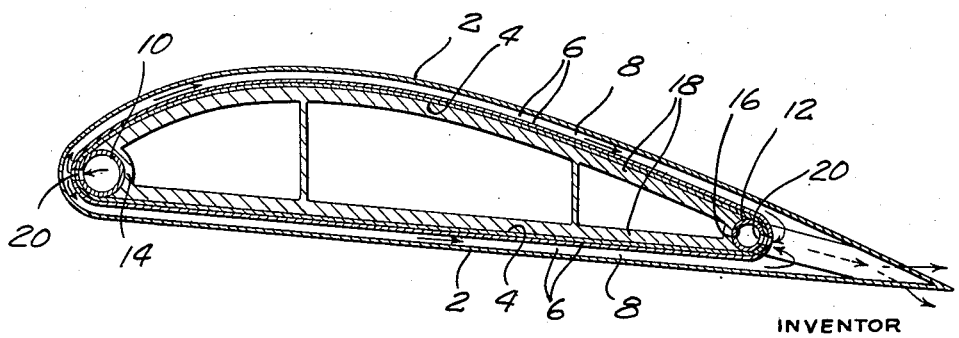

Figure 1 is a perspective view of an airplane wing having the present invention embodied therein, parts being broken away to show details of the sheathing and duct construction;

Figure 2 shows a slight modification of the wing construction in which the sheathing is provided with bleed holes from the ducts to the outer surface thereof to permit a portion of the heating or other conditioning fluid to be discharged into the slip stream and over said surface to aid in the conditioning operation, this view showing also a different source of heating fluid, and Figure 3 is a transverse section through an airplane wing having the present invention embodied therein.

In the illustrated preferred embodiment of the invention the ducts through which the heating or other conditioning fluid is brought into heat exchanging relation to the surface of the sheathing are provided, without substantial increase in the weight of the sheathing and with a considerable increase in the stiffening of the sheathing, by forming the sheathing material of three or more laminae, of which the outer laminae 2 and 4 are plane sheets and the intermediate lamina 6 is so corrugated that when the laminae are assembled as shown in Figure 1, it forms with the two plane laminae a plurality of ducts 8 providing heat exchanging conduits throughout the area of the sheathing.

Although this is the preferred construction and represents the simplest and lightest construction for obtaining the overall arrangement of heat exchanging conduits, it will be understood that the invention is not necessarily limited to the particular duct construction shown.

The ducts 8 are preferably arranged to extend from front to rear of the airplane wings and communicate at their respective ends with intake manifolds 10 and exhaust manifolds 12. As shown in Figures 1 and 3, these manifolds 10 and 12 may be received in recesses 14 and 16 cast in the front and rear ends of the form ribs 18 of the wing. It will thus be seen that very little alteration in the construction of the wing structure itself will be necessary to accommodate the present invention.

In the form of the invention shown in Figure 1, both the upper and lower surfaces of the wing are provided with sheathing having the ducts 8 of the present invention therein and the manifolds 10 and 12 are therefore provided with openings communicating both with the ducts in the upper sheathing of the wing and with those in the lower sheathing. These openings 20 are of such dimensions as to insure distribution of the heating or other conditioning fluid to all of the ducts 8, both of the sheathing on the upper surface of the wing and of the sheathing on the lower surface. This means usually that consideration must be taken of the amount of fluid which is to flow through the intake manifolds and the rate of flow so that each opening 20 of each intake manifold may offer sufficient resistance to the flow to insure some of the fluid flowing through the other openings.

The fluid distributed through the manifolds 10 and 12 and ducts 8 may be any suitable conditioning fluid but, for the purposes of illustration, is shown in Figure 1 as heated air designed to maintain the wing surfaces in a sufficiently heated condition to prevent the accumulation of ice or dew on said surfaces to an extent sufficient to change the aerodynamic characteristics thereof. This heated air may be obtained from any suitable existing source of hot air supply upon the plane, such, for example, as the hot air produced as an incident to cooling the motor cylinders or special means may be provided both for heating the air and for circulating it. For purposes of illustration, the air is herein shown as heated in passing through a coil 22 exposed, in a chamber 24, to the exhaust gases which enter the chamber at 26 and pass out at 28. This air may be driven by means of a rotary fan or propeller 30 or other blower construction through a pipe 32 connected to the coil 22 at one end and to the intake manifold 10 at its other end to insure the forcing of the air through the ducts 8 of the sheathing. The used air from the exhaust manifold 12 may be discharged into the slip stream in any suitable manner as, for example, by means of exhaust pipes 34 at the rear of the wing.

In the modification shown in Figure 2, a portion of the hot air or other conditioning fluid passing through the ducts 8 is allowed to escape through bleed holes 36, on the outer surface of the sheathing, directly into the slip stream passing over the sheathing to assist in conditioning the outer surface of the sheathing, the remainder of the fluid passing out through the exhaust manifold 12 and exhaust pipes 34 in the usual manner. In this figure is also shown the use of a portion of the exhaust gases in the conduits 8 instead of air heated by said gases. Control of the by-passing of the exhaust gases into the heating system may be effected by means of a butterfly valve 37.

Any suitable means may be provided for controlling the heating of the air, such, for example, as the cutout valve 38 opposite intake 26 into the casing 24, and any suitable means may be provided for controlling the flow of the hot air or other conditioning fluid through the system, such, for example, as a butterfly valve 40 in one of the manifolds.

It will be understood that there may be a number of independent intake manifolds 10 and cooperating independent exhaust manifolds 12 throughout the length of an airplane wing. Preferably there will be as many manifolds lengthwise of the wing as there are motors, each motor supplying the heat for the air to be delivered to its associated manifold.

As hereinabove suggested, although the invention is illustrated and described in its application to the wing or airfoil of an airplane, it will be understood that it is equally applicable to any other sheathed surface which is so affected by icing or other conditions as to change the aerodynamic characteristics thereof and thus of the plane as a whole.

Although the ducts 8 in the preferred embodiment of the invention are shown as running from front to rear of the airplane wing, it will be understood that the invention is not limited to this arrangement of the ducts. It will also be understood that the conditioning fluid employed may be other than hot air to suit any particular condition to be overcome.

The invention, as herein shown and described, is intended primarily, of course, for conditioning the outer surfaces of airfoils but it will be apparent that heat exchange will also take place through the inner walls of the ducts 8 and thus the ducts, unless insulated from the space within the wings, may be used at the same time to heat the interior spaces or otherwise condition them.

Although the pressure required to insure circulation of the conditioning fluid through the sheathing ducts is not very great, it may be advisable, to prevent any accidental injury to the sheathing, to provide a safety valve or other means in the circulating system to prevent dangerous accumulations of pressure. Such a safety valve 42 may be attached, as shown in Figure 1, to the intake manifold. As also shown in Figure 1, an equalizer or balancing means may be provided for obtaining uniformity of flow, the illustrated means comprising a metallic expansion bellows 44, also connected to the intake manifold.

What is claimed as new is:

1. In anti-icing or other airfoil conditioning means for airplanes, the combination with the airfoil frame of airfoil sheathing formed of outer and inner plane laminae and an intermediate corrugated lamina so connected at the high points of its corrugations to the adjacent plane laminae as to reinforce the sheathing as a whole and to form outer and inner sets of closely spaced ducts through which a heating fluid may be caused to flow in heat-exchanging relation to the two surfaces of said sheathing, one set of said ducts having the outer plane lamina as a direct conducting wall and the other set having the inner plane lamina as a direct conducting wall, intake and exhaust manifolds located within said airfoil and having, respectively, fluid distributing and fluid collecting communications with both sets of said ducts at the respective ends thereof and means, connected to the appropriate manifolds, for effecting a positive circulation of heating fluid through said ducts.

2. Airfoil conditioning means according to claim 1 in which the openings from the intake manifold into the respective ducts are so proportioned to the flow of heating fluid through the manifold as to insure delivery of heating fluid to each duct.

3. Airfoil conditioning means according to claim 1 in which bleed holes through the outer lamina of the sheathing, through which the ducts of the outer set communicate with the outside surface of the sheathing, permit escape of a portion of the conditioning fluid from the ducts to the surface of the sheathing and into the slip stream passing thereover.

WILFRED THOMAS.

REFERENCES CITED

The following references are of record in the file of this patent:

UNITED STATES PATENTS

| Number | Name | Date |
|---|---|---|
| 2,077,732 | Adams | Apr. 20, 1937 |
| 2,142,699 | Riddle | Jan. 3, 1939 |
| 2,256,393 | Klein | Sept. 16, 1941 |
| 2,374,441 | Loufek | Apr. 24, 1945 |
| 2,379,183 | Price | June 26, 1945 |

FOREIGN PATENTS

| Number | Country | Date |
|---|---|---|
| 97,141 | Sweden | Oct. 17, 1939 |
| 486,549 | Great Britain | June 7, 1938 |
| 748,657 | France | Apr. 25, 1933 |